(12) United States Patent
Shinohara et al.

(10) Patent No.: US 7,095,200 B2
(45) Date of Patent: Aug. 22, 2006

(54) POWER WINDOW APPARATUS WITH PINCH DETECTING FUNCTION

(75) Inventors: Akihiko Shinohara, Miyagi-ken (JP); Hiroya Nomura, Miyagi-ken (JP); Kazuhito Matsubara, Miyagi-ken (JP); Kenichi Seino, Miyagi-ken (JP); Akira Sasaki, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 11/230,232

(22) Filed: Sep. 13, 2005

(65) Prior Publication Data

US 2006/0061314 A1 Mar. 23, 2006

(30) Foreign Application Priority Data

Sep. 16, 2004 (JP) ............................. 2004-270244
Nov. 9, 2004 (JP) ............................. 2004-325187

(51) Int. Cl.
*E05F 15/16* (2006.01)

(52) U.S. Cl. ........................... 318/469; 318/286; 49/31

(58) Field of Classification Search ........ 318/264–266, 318/283–286, 434, 466–470; 49/26, 29, 49/31

See application file for complete search history.

(56) References Cited

U.S. PATENT DOCUMENTS 5,422,551 A 6/1995 Takeda et al.
5,530,329 A 6/1996 Shigematsu et al.
5,986,421 A 11/1999 Fukazawa et al.
6,347,482 B1 * 2/2002 Takiguchi et al. ............. 49/28
6,646,398 B1 * 11/2003 Fukazawa et al. .......... 318/445
2002/0149334 A1 10/2002 Nagaoka

FOREIGN PATENT DOCUMENTS

JP 7-113375 5/1995

* cited by examiner

*Primary Examiner*—Bentsu Ro
(74) *Attorney, Agent, or Firm*—Brinks Hofer Gilson & Lione

(57) ABSTRACT

An MCU determines whether a backlash over a predetermined value exists in a driving system including a motor and a window driving mechanism. Then, when it is determined that the backlash over the predetermined value exists in the driving system, the MCU sets the time passed from the detection of the peak of the number of rotations of the motor to a predetermined additional time as a termination time of a start cancellation period. When it is determined that the backlash over the predetermined value does not exist in the driving system, the MCU sets, as the termination time of the start cancellation period, the time when the rate of change of the number of revolutions of the motor reaches a predetermined value or the time when the rate of change of a motor input ratio reaches a predetermined value.

5 Claims, 9 Drawing Sheets

GENERAL RAISE OF WINDOW WITHOUT BACKLASH

GENERAL RAISE OF WINDOW WITH BACKLASH

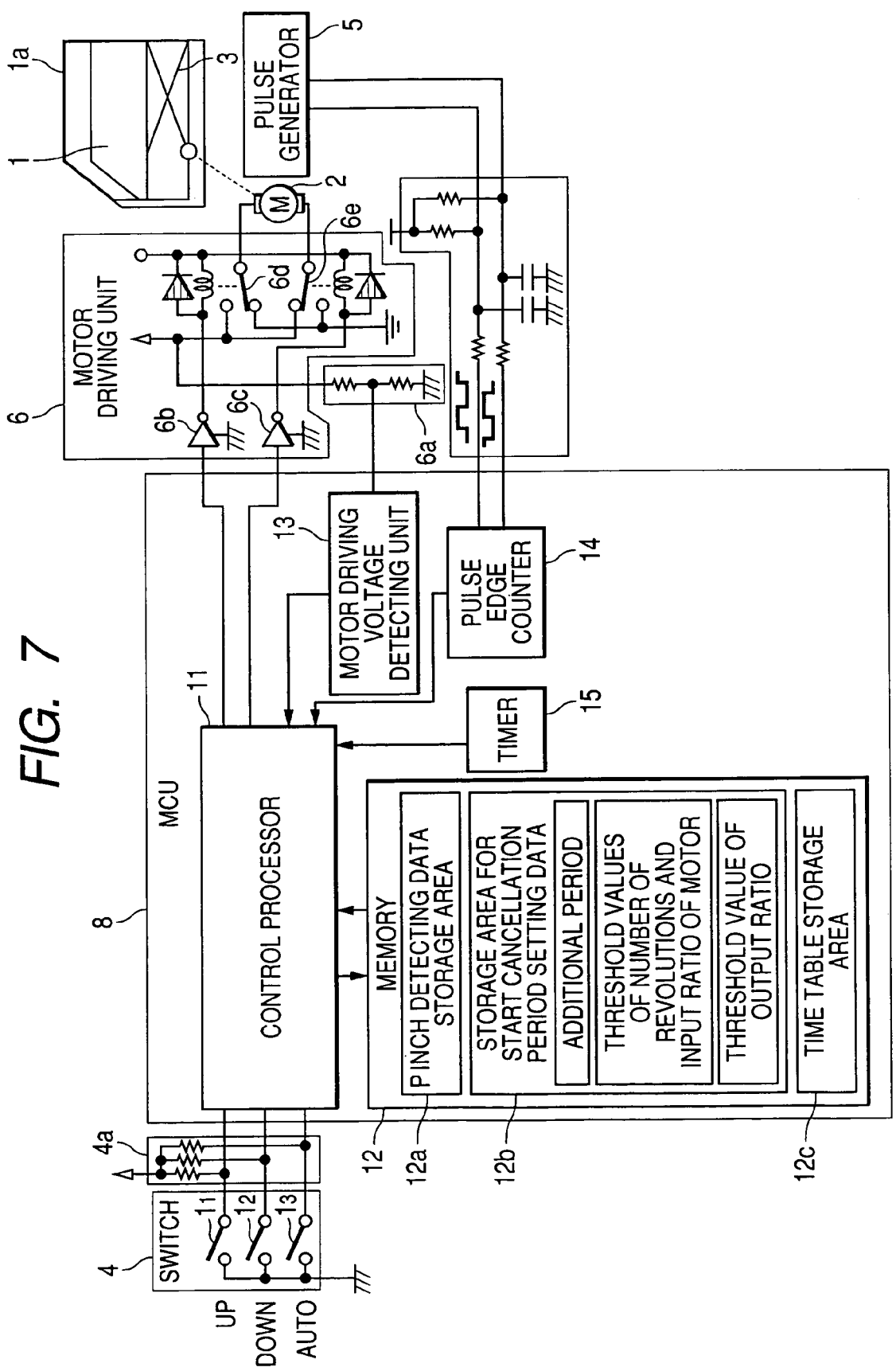

POWER WINDOW APPARATUS WITH PINCH DETECTING FUNCTION

This application claims the benefit of priority to Japanese Patent Application Nos. 2004-270244 filed on Sep. 16, 2004 and 2004-325187 filed on Nov. 9, 2004, both herein incorporated by reference.

BACKGROUND OF THE INVENTION

1. Field of the Invention

The present invention relates to a power window apparatus with a pinch detecting function, and more particularly, to an apparatus setting a start cancellation period in which pinch detection is not performed, according to whether a backlash (allowance) exists in a motor that raises and lowers a window and in a window driving mechanism that connects the window to the motor, thereby more reliably detecting a pinch of a foreign object.

2. Description of the Related Art

A power window apparatus with a pinch detecting function has been proposed. When a pinching of a foreign object occurs when a window is raised or lowered by driving force of a motor, the power window apparatus controls the motor to perform a process for avoiding the pinching, which stops or reversely rotates the motor. The power window apparatus includes a pulse encoder that generates pulse signals according to the rotation of the motor, a monitoring unit that monitors the number of revolutions of the motor on the basis of the pulses output from the pulse encoder during the rising of the window, a detecting unit that detects the pinching in a case in which the relative decrement of the number of revolutions of the motor exceeds a predetermined determination reference value during the rising of the window, and a determination reference changing unit that increases a determination reference value during a period from the time when the window starts rising after the lowering of the window to the time when the motor is rotated at a predetermined number of revolutions, as a device having a countermeasure against the backlash (allowance) of a driving device (for example, JP-A-07-113375).

According to the power window apparatus with a pinch detecting function, the determination reference value is increased by the determination reference-changing unit during the period from the time when the window starts rising after the lowering of the window to the time when the motor is rotated at a predetermined number of revolutions. Therefore, the motor rotates at high speed as a state close to unloaded condition in the early period when the window is reversed from the lowering to the rising thereof by the backlash of the driving system from the motor to the window. After that, the number of revolutions of the motor decreases to be stabilized, which is hardly detected as the occurrence of the pinching. Furthermore, since the power window apparatus with a pinch detecting function does not prohibit the determination of the pinching even during the period in which the determination reference value increases, it is possible to use a function as an operation for preventing the pinching.

In addition, in a technology disclosed in Japanese Unexamined Patent Application Publication No. 07-113375, the determination of the pinching is not prohibited in the early period even when the window is reversed from the lowering to the rising thereof, and a function as an operation for preventing the pinching is used. However, another power window apparatus with a pinch detecting function has been proposed. Another power window apparatus sets, as a start cancellation period, a predetermined period from the time when the motor is started to the time when the number of revolutions of the motor reaches a stable point, and does not determine whether a pinching occurs in the window in the period.

Meanwhile, the backlash occurring in the driving system has different sizes according to the vehicles, depending on the accuracy when the motor and the window driving mechanism are manufactured and assembled to a vehicle. Furthermore, the size of the backlash varies with time. In addition, the backlash is large when the window is reversed from the lowering to the rising thereof. The backlash is small when the window rises again after the rising thereof.

On the other hand, in the technology disclosed in Japanese Unexamined Patent Application Publication No. 07-113375, the determination reference value is increased for a predetermined time after the motor is started. However, the 'period in which the number of revolutions reaches a predetermined number of revolutions' is a predetermined period prescribed in each power window apparatus, and the 'determination reference' is a fixed value selected from a range of 1.5 to 4 times of a general determination reference. As described above, since a variation exists in the size of the backlash of the driving system shown in each vehicle, the 'period in which the number of revolutions reaches a predetermined number of revolutions' and the 'determination reference' must correspond to the upper limit of the distribution of the backlash. Consequently, it is regarded that the 'period when the number of revolutions reaches the predetermined number of revolutions' cannot but be set as a substantially long period, and the 'determination reference' cannot but be set as a substantially large value. As a result, it is possible to determine whether the pinching occurs or not soon after the reverse of a door glass, which causes problems in that the reliability thereof is lowered and the period is lengthened. Furthermore, the conventional technology has a countermeasure without exception only when the window is reversed from the lowering to the rising thereof. However, there are times when the backlash is small even when the window is reversed from the lowering to the rising thereof, and when the backlash is large even when the window rises again after the rising thereof.

In addition, the power window apparatus with a pinch detecting function, which sets the predetermined period from when the motor is started to when the number of revolutions of the motor reaches a stable point as a start cancellation period and does not perform the determination of the pinching in the period, has also a problem in that the start cancellation period is lengthened.

SUMMARY OF THE INVENTION

The invention has been made to solve the above-mentioned problems, and it is an object of the invention to provide a power window apparatus with a pinch detecting function that can optimize a start cancellation period depending on the size of the backlash occurring in a power window driving system, and more accurately determine a pinching of a foreign object.

In order to achieve the above-mentioned object, according to an aspect of the invention, a power window apparatus includes a motor that opens and closes a window through a window driving mechanism, a pulse generator that outputs pulse signals corresponding to a rotation of the motor, a switch device that outputs switch signals to manually open and close the window, and a control unit that generates control signals for controlling the motor according to the pulse signals and the switch signals. In this case, when the window is operated to be closed by the switch device, the control unit determines whether a pinching occurs in the window. When it is determined that the pinching occurs in the window, the control unit performs a process required for avoiding the pinching. Furthermore, the control unit does not determine whether the pinching occurs or not in a start cancellation period from the time when the motor is started to the time when the number of revolutions of the motor reaches a stable point. In addition, the control unit includes a backlash-detecting member for detecting a backlash of a driving system having the window driving mechanism, and determines whether a backlash over a predetermined value exists in the driving system on the basis of input from the backlash-detecting member. When it is determined that the backlash over the predetermined value exists in the driving system, the control unit sets a termination time of the start cancellation period on the basis of the time when the peak of the number of revolutions of the motor is detected. When it is determined that the backlash over the predetermined value does not exist in the driving system, the time when the rate of change of the number of revolutions of the motor reaches a predetermined value or the time when the rate of change of the motor input ratio reaches a predetermined value is set to the termination time of the start cancellation period.

In addition, in the above-mentioned power window apparatus with a pinch detecting function, it is preferable that, when the backlash over the predetermined value exists in the driving system, a period from the time when the peak of the number of revolutions of the motor is detected to the time when the number of revolutions of the motor reaches the stable point be obtained in advance, and the time passed from the detection of the peak of the number of revolutions of the motor to the previously obtained time be set as the termination time of the start cancellation period.

In order to achieve the above-mentioned object, according to another aspect of the invention, a power window apparatus includes a motor that opens and closes a window through a window driving mechanism, a pulse generator that outputs pulse signals corresponding to a rotation of the motor, a switch device that outputs switch signals to manually open and close the window, and a control unit that generates control signals for controlling the motor according to the pulse signals and the switch signals. In this case, when the window is operated to be closed by the switch device, the control unit determines whether a pinching occurs in the window. When it is determined that the pinching occurs in the window, the control unit performs a process required for avoiding the pinching. In addition, the control unit does not determine whether the pinching occurs in a start cancellation period from the time when the motor is started to the time when the number of revolutions of the motor reaches a stable point. The control unit computes a motor output ratio from the start time of the motor to determine whether a backlash over a predetermined value exists in a driving system including the window driving mechanism and the motor by comparing the computed output ratio with a predetermined threshold value of the output ratio obtained in advance, and detects the number of revolutions of the motor. When it is determined that the computed output ratio of the motor is higher than a predetermined threshold value of the output ratio, the control unit determines that the backlash over the predetermined value exists in the driving system and sets a termination time of the start cancellation period on the basis of the time when the peak of the number of revolutions of the motor is detected. When it is determined that the backlash over the predetermined value does not exist in the driving system, the time when the rate of change of the number of revolutions of the motor reaches a predetermined value or the time when the rate of change of a motor input ratio reaches a predetermined value is set to the termination time of the start cancellation period.

Furthermore, in the above-mentioned power window apparatus with a pinch detecting function, it is preferable that the control unit vary the predetermined threshold value of the output ratio depending on an input voltage value of the motor.

Further, in the above-mentioned power window apparatus with a pinch detecting function, it is preferable that, when the backlash over the predetermined value exists in the driving system, a period from the time when the peak of the number of revolutions of the motor is detected to the time when the number of revolutions of the motor reaches the stable point be obtained in advance, and the time passed from the detection of the peak of the number of revolutions of the motor to the previously obtained time be set as the termination time of the start cancellation period.

In a case in which the window is operated to be raised, when a backlash does not exist in the driving system raising and lowering the window and no foreign object is pinched at the time of the start of the motor, as shown in FIG. 6A, the number of revolutions of the motor and the motor input ratio [the ratio of a first delay value (correction voltage) Vout1 of an input voltage Vin to the input voltage Vin, that is, Rin=Vout1/Vin] gradually increase from the time of the start of the motor. However, the rate of increase thereof decreases with the passage of time, and becomes a predetermined stable value after the passage of a predetermined time from the time of the start of the motor. Correspondingly, in a case in which a backlash exists in the driving system for raising and lowering the window and no foreign object is pinched at the time of the start of the motor, as shown in FIG. 6B, since the motor enters a state close to unloaded condition, the number of revolutions of the motor drastically increases to become a peak after the passage of the time according to the size of the backlash of the driving system, and then decreases to a predetermined stable value. In addition, the motor input ratio is varied as in the case in which a backlash does not exist in the driving system. As described above, since the motor input ratio has a stable output regardless of the backlash, it may be determined that the rotation of the motor is stable. However, in a case in which a backlash exists in the driving system, since it cannot be told that the rotation of the motor is stable even at the time when the motor input ratio is stable, it is not available. Here, the input voltage Vin is a voltage detected by a motor driving voltage detector.

Meanwhile, the number of revolutions of the motor is remarkably varied depending on the absence or presence of the backlash in the driving system. Furthermore, when a backlash exists in the window driving system, the time T1 from when the motor is started to when the number of revolutions of the motor reaches the peak is varied depending on the size of the backlash shown in the driving system. However, the time T2 from when the number of revolutions of the motor reaches the peak to when the number of revolutions of the motor reaches the stable point P is hardly affected by the size of the backlash shown in the driving system. Accordingly, the time T2 has a small variation and can be obtained in advance by experiments or simulations. Consequently, when it is determined that the backlash over the predetermined value exists in the driving system, the power window apparatus can set the time T2 from when the peak of the number of revolutions of the motor is detected to when the number of revolutions of the motor reaches the stable point obtained in advance at the termination of the start cancellation period T, and can optimize the termination time of the start cancellation period T depending on the size of the backlash shown in the driving system. Therefore, it is possible to prevent the start cancellation period from being set to be unnecessarily long at the time of the start of the motor, and to more reliably detect whether the pinching occurs in the window, thereby further improving the reliability of the power window apparatus with a pinch detecting function.

Furthermore, when the backlash over the predetermined value does not exist in the driving system, the number of revolutions of the motor and the motor input ratio gradually increase in a characteristic curve peculiar to each window driving mechanism. Therefore, when the rate of change of the number of revolutions of the motor (the rate of the number of revolutions when the number of revolutions is measured at the stable point P) or the motor input ratio reaches a predetermined value (for example, 97%), it is regarded that the number of revolutions of the motor reaches the stable point P. Consequently, since the setting of the termination time of the start cancellation period can be optimized at the time of the start of the motor by using the time when the rate of change of the number of revolutions of the motor reaches a predetermined value or when the motor input ratio reaches a predetermined value as the termination time of the start cancellation period, it is possible to further improve the reliability of the power window apparatus with a pinch detecting function.

Meanwhile, as described above, the backlash-detecting member is provided to detect the backlash of the driving system, which raises and lowers the window. Also, there is a method that detects the backlash by measuring the motor output ratio.

In a case in which the window is operated to be raised, when a backlash does not exist in the driving system for raising and lowering the window and no foreign object is pinched at the time of the start of the motor, as shown in FIG. 8, the motor output ratio [the ratio of the electric voltage Vout2 to the first delay value (correction voltage) Vout1 of the input voltage Vin=Vout2/Vout1] is changed to a substantially constant value. In addition, as shown in FIG. 6A, the motor input ratio [the ratio of the first delay value (correction voltage) Vout1 of the input voltage Vin to the input voltage Vin, that is, Rin=Vout1/Vin] gradually increases from the time of the start of the motor. However, the rate of increase thereof decreases with the passage of time, and becomes a predetermined stable value after the passage of a predetermined time from the time of the start of the motor. Moreover, the number of revolutions also gradually increases from the time of the start of the motor. However, the rate of increase thereof decreases with the passage of time, and becomes a predetermined stable value after the passage of a predetermined time from the time of the start of the motor.

Correspondingly, when a backlash exists in the driving system for raising and lowering the window and no foreign object is pinched at the time of the start of the motor, the motor enters a state close to unloaded condition. Therefore, as shown in FIG. 8, the motor output ratio becomes a considerably high value, and then decreases with the number of revolutions of the motor to become a predetermined stable value after the passage of a predetermined time from the time of the start of the motor. As shown in FIG. 6B, since the motor enters a state close to unloaded condition, the number of revolutions of the motor drastically increases to the peak after the passage of the time according to the size of the backlash of the driving system, and then decreases to a predetermined stable value. In addition, the motor input ratio is varied as in the case in which a backlash does not exist in the driving system.

As described above, since the motor output ratio is remarkably varied depending on the absence or presence of the backlash in the driving system, it is possible to determine whether a backlash over a predetermined value exists or not in the driving system by monitoring the value of the motor output value.

Further, as shown in FIG. 8, since the motor output ratio is varied depending on the value of the input voltage of the motor, the control unit can accurately determine whether a backlash over a predetermined value exists or not in the driving system by changing the threshold value of the predetermined output ratio, which is a determination reference, depending on the input voltage value of the motor.

As described above, a method, which uses the change of the number of revolutions of the motor or the motor input ratio, is employed to optimize the termination time of the start cancellation period after determining whether a backlash exists in the window driving system by the motor output ratio.

BRIEF DESCRIPTION OF THE DRAWINGS

FIG. 7 is a block diagram showing a power window apparatus with a pinch detecting function according to a second embodiment of the invention;

DESCRIPTION OF THE PREFERRED EMBODIMENTS

Figure 1:
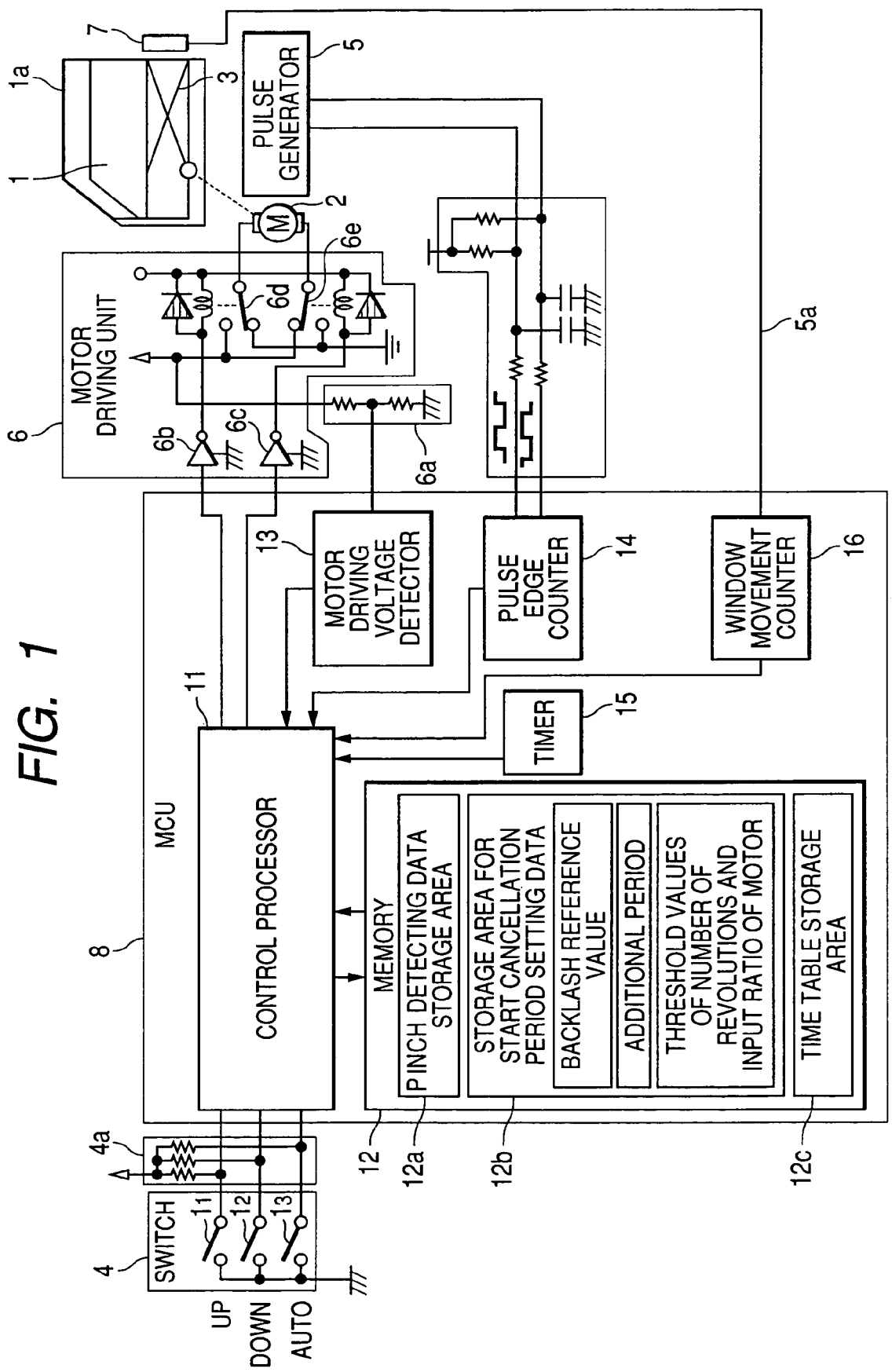
FIG. 1 is a block diagram showing a power window apparatus with a pinch detecting function according to a first embodiment of the invention.
Figure 2A:
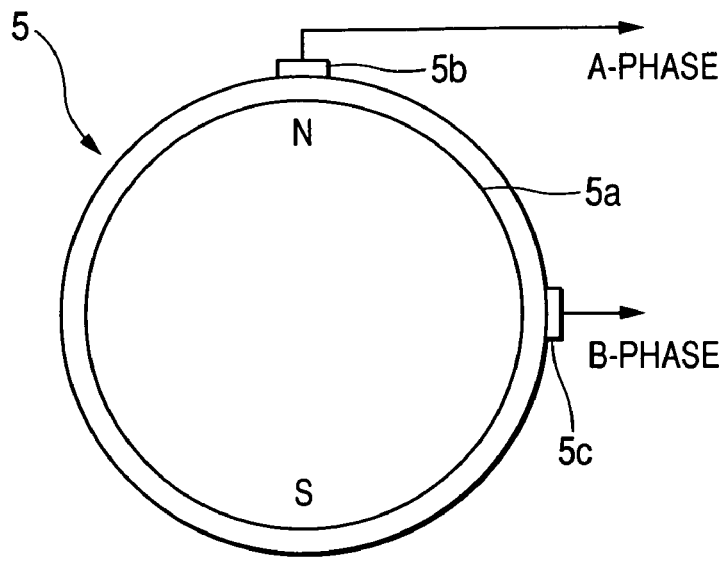
FIGS. 2A and 2B are views illustrating the structure of a pulse generator and waveforms of pulse signals output from the pulse generator, respectively.
Figure 2B:
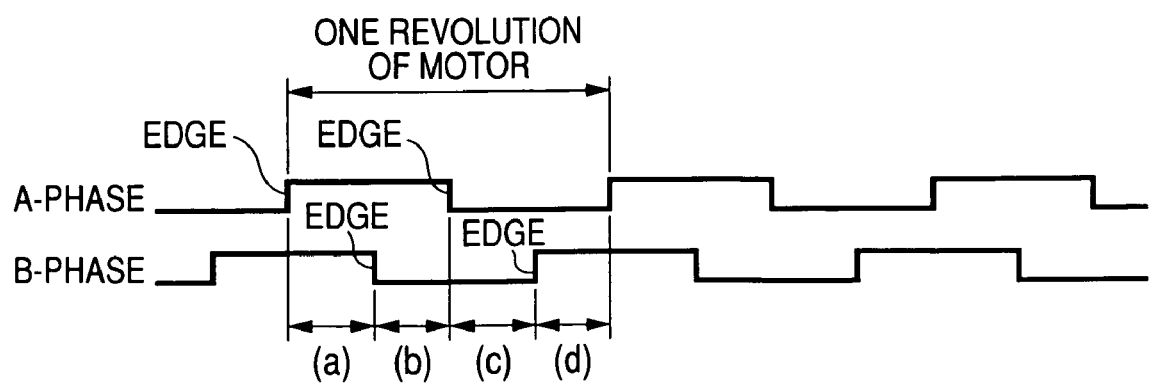
Figure 3:
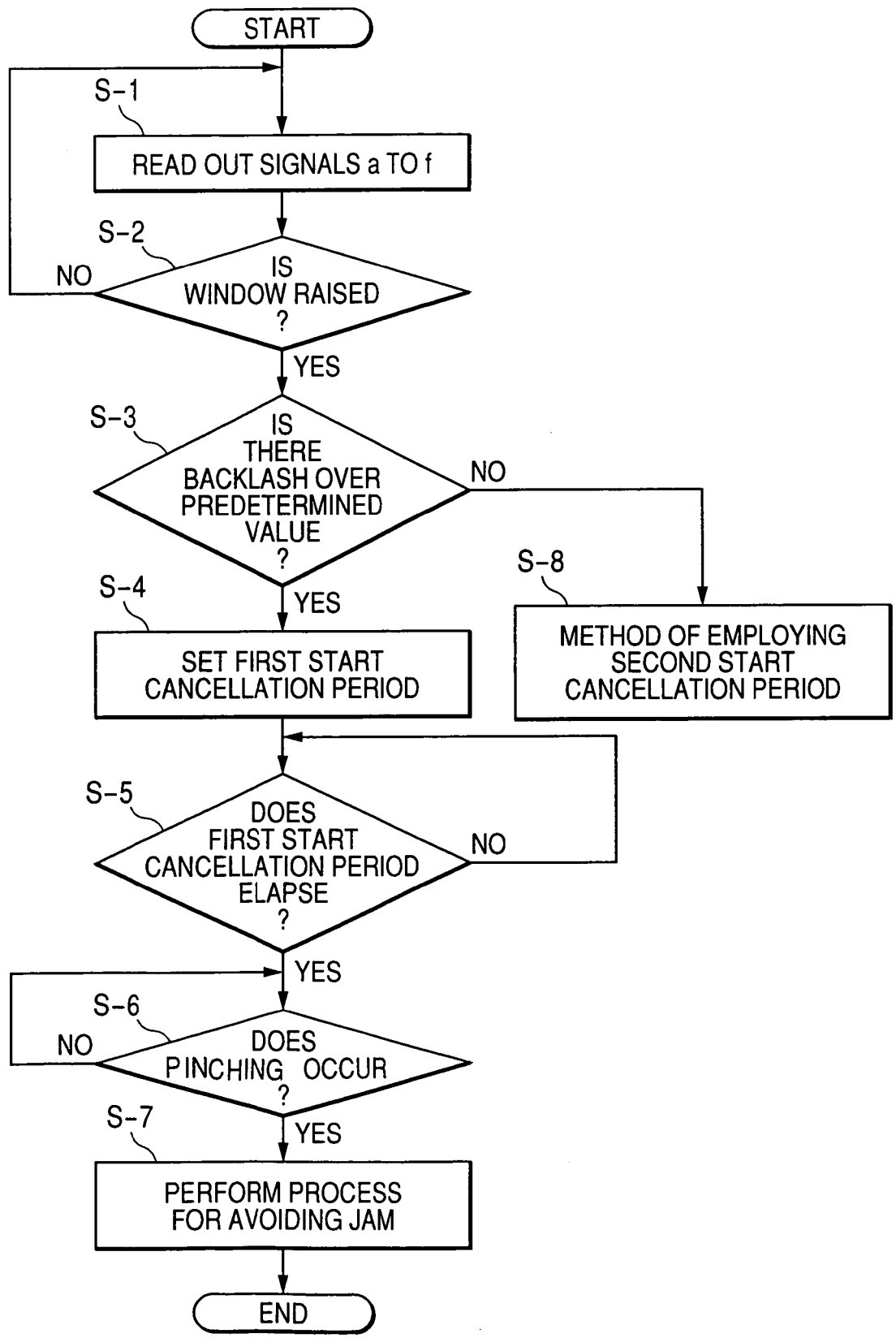
FIG. 3 is a flowchart showing the operational sequence of the power window apparatus with a pinch detecting function according to the present embodiment.
Figure 4:
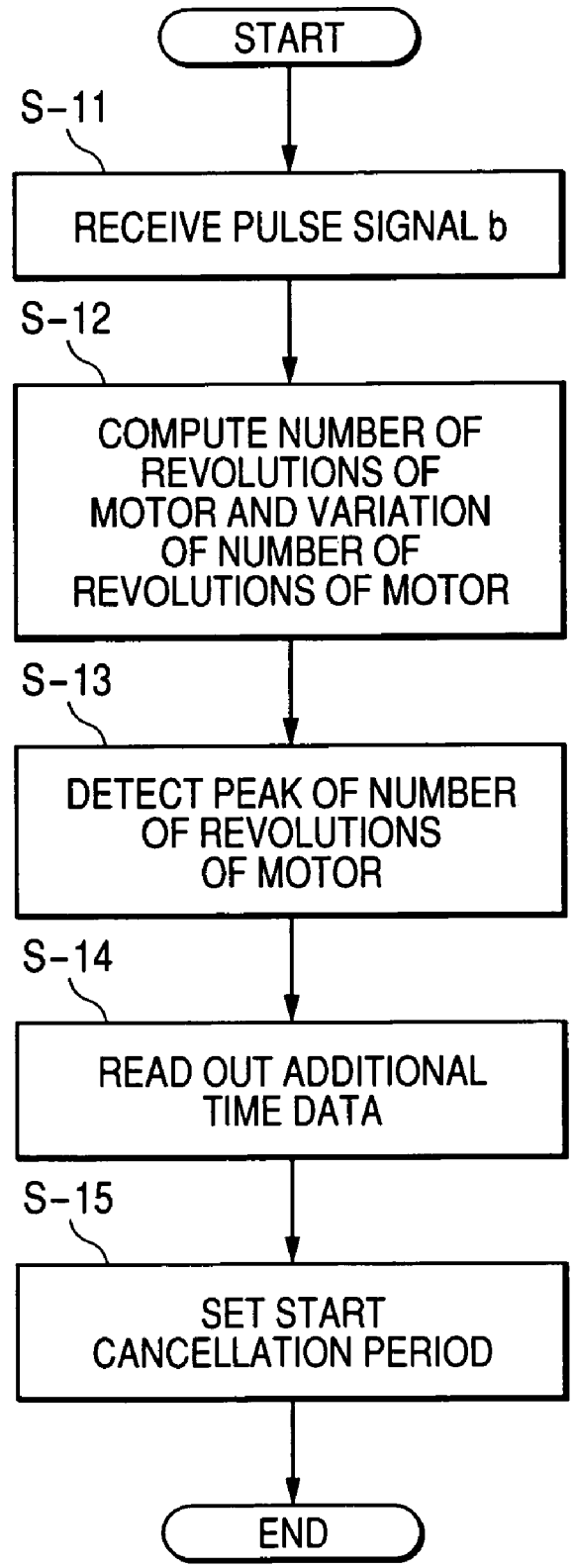
FIG. 4 is a flowchart showing the sequence for setting a first start cancellation period in the power window apparatus with a pinch detecting function according to the present embodiment.
Figure 5:
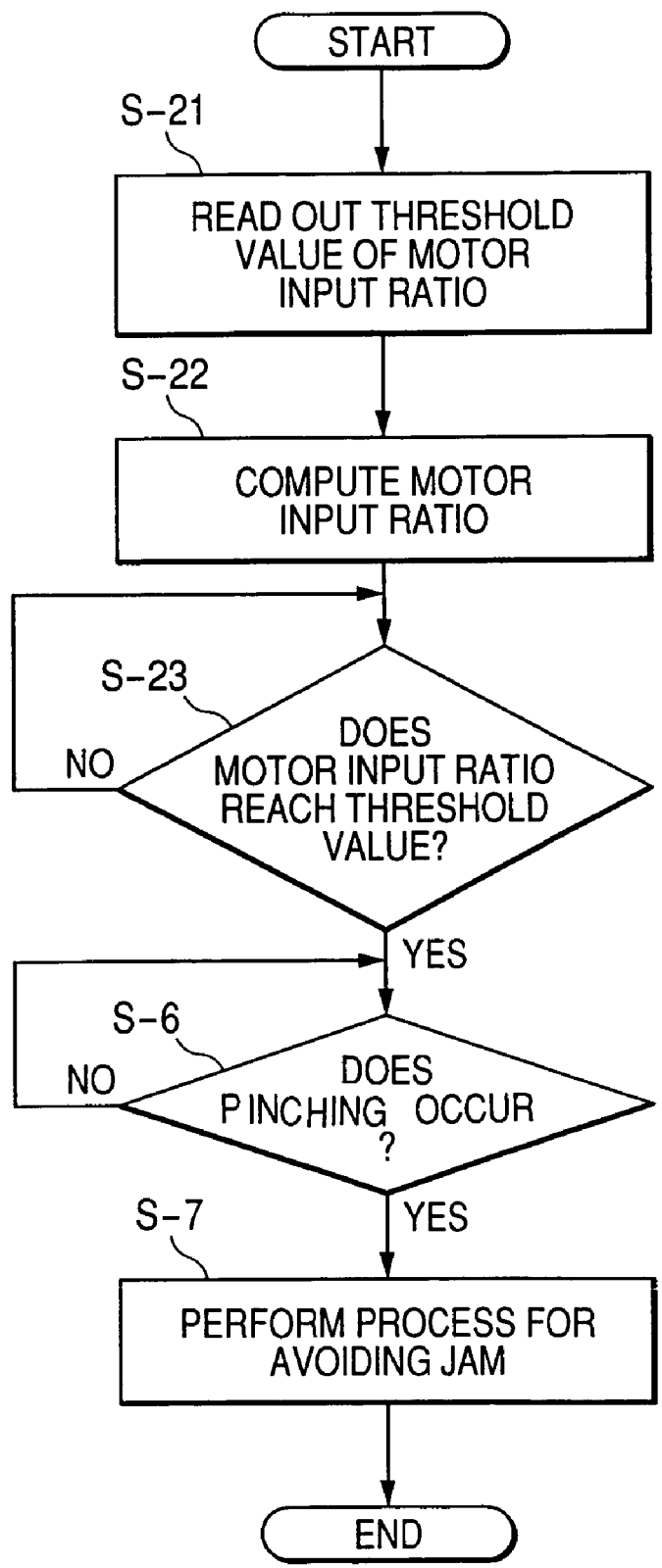
FIG. 5 is a flowchart showing the sequence in accordance with a method of setting a second start cancellation period in the power window apparatus with a pinch detecting function according to the present embodiment.
Figure 6A:
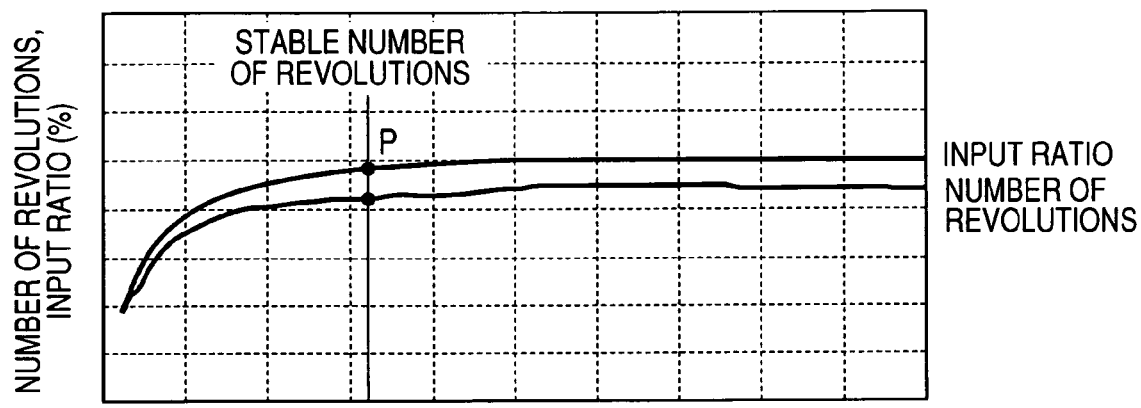
FIGS. 6A and 6B are graphs showing a variation of the number of revolutions of the motor and a motor input ratio from the start of the motor.
Figure 6B:
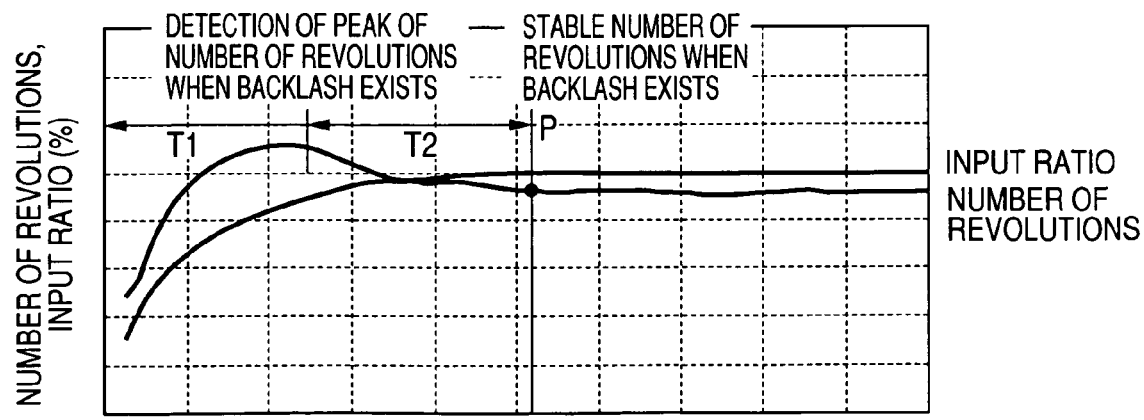
Figure 8:
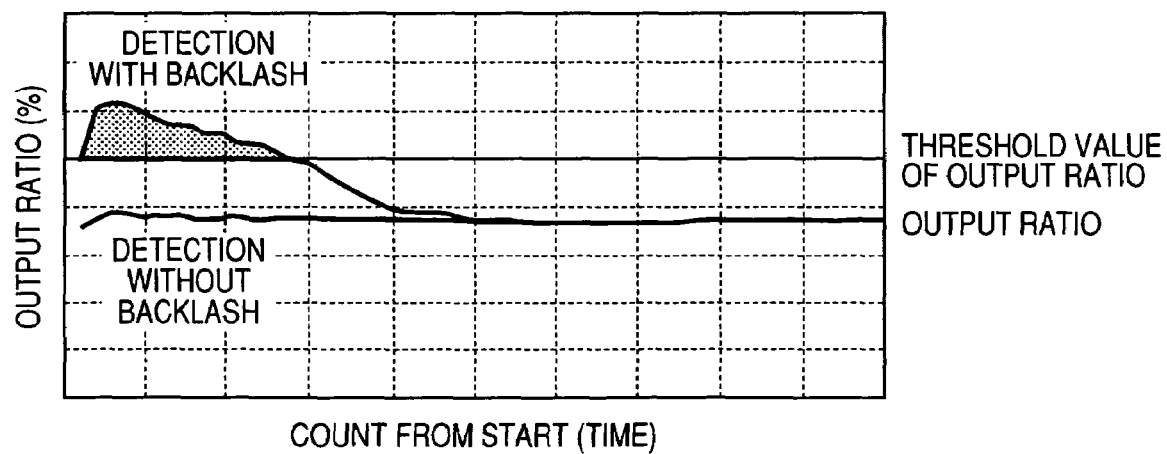
FIG. 8 is a graph showing the relation between an output ratio and a backlash in the power window apparatus with a pinch detecting function according to the second embodiment of the invention.
Figure 9:
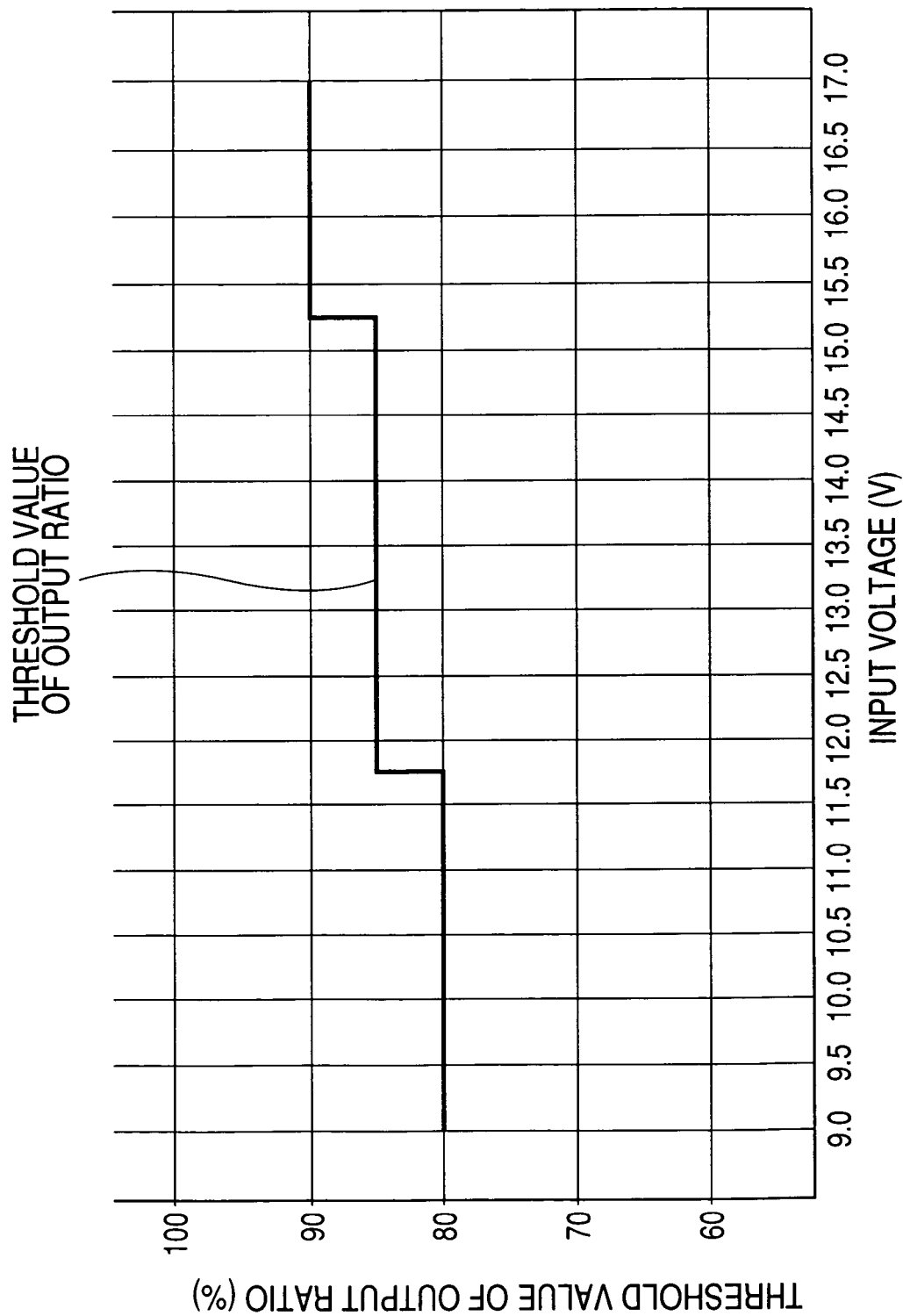
FIG. 9 is a graph showing the relation between a threshold value of the output ratio and an input ratio in the power window apparatus with a pinch detecting function according to the second embodiment.

Hereinafter, a power window apparatus with a pinch detecting function according to embodiments of the invention will be described with reference to FIGS. 1 to 9. FIG. 1 is a block diagram showing a power window apparatus with a pinch detecting function according to a first embodiment of the invention. FIGS. 2A and 2B are views illustrating the structure of a pulse generator and waveforms of pulse signals output from the pulse generator, respectively. FIG. 3 is a flowchart showing the operational sequence for the power window apparatus with a pinch detecting function according to the present embodiment. FIG. 4 is a flowchart showing the sequence for setting a first start cancellation period in the power window apparatus with a pinch detecting function according to the present embodiment. FIG. 5 is a flowchart showing the sequence of a method of setting a second start cancellation period in the power window apparatus with a pinch detecting function according to the present embodiment. FIGS. 6A and 6B are graphs showing the variation of the number of revolutions of the motor and a motor input ratio from the start of the motor. FIG. 7 is a block diagram showing a power window apparatus with a pinch detecting function according to a second embodiment of the invention. FIG. 8 is a graph showing the relation between the output ratio and backlash of the power window apparatus with a pinch detecting function according to the second embodiment of the invention. FIG. 9 is a graph showing the relation between the threshold value of the output ratio and the input ratio of the power window apparatus with a pinch detecting function according to the second embodiment.

As shown in FIG. 1, the power window apparatus with a pinch detecting function according to the first embodiment mainly includes a window 1, a motor 2 that raises and lowers the window 1, a window driving mechanism 3 that connects the window 1 with the motor 2, a switch device 4 that switches a driving direction and a driving method of the motor 2, a pull-up resistor 4a, a pulse generator 5 that detects the rotational state of the motor 2, a pulse transmission path 5a, a motor driving unit 6 that supplies a required driving voltage to the motor 2, a resistor divider 6a, a window motion detecting unit 7 that detects the operational state of the window 1, and a micro control unit (MCU, a control unit) 8. The micro control unit 8 generates signals for controlling the motor 2, on the basis of switch signals output from the switch device 4 and pulse signals output from the pulse generator 5, to control the rotation of the motor 2 through the motor driving unit 6, and sets the start cancellation period canceling the detection of the pinching, on the basis of the pulse signals and the detection signals output from the window motion detecting unit 7. Meanwhile, a system composed of the motor 2 and the window driving mechanism 3 is referred to as a 'window driving system' or a 'driving system' in this specification. In addition, the pulse generator 5 and the window motion detecting unit 7 constitute a backlash-detecting member.

The window 1 is mounted in a door of a vehicle so that the window can be raised or lowered. Therefore, the window 1 is raised and lowered by the motor 2 of the window driving mechanism 3. The window driving mechanism 3 is composed of a power transmitting device, which is capable of stably supporting the window 1 and of reliably transmitting driving force of the motor 2 to the window 1, such as a link mechanism, a rack and pinion mechanism, a wire mechanism wound on a wire reel, or a combination thereof. The motor 2 is connected to a movable part of the window driving mechanism 3.

The switch device 4 is provided on the inner surface of the door, and includes at least three switches (not shown), that is, a switch for causing the window to be raised, a switch for causing the window to be lowered, and a switch for causing the operation of the window 1 to be automatically continued. When the switch for causing the window to be raised or the switch for causing the window to be lowered is independently operated, the window 1 is raised or lowered during the period in which the switch is being operated. In this case, the raising or lowering of the window 1 is stopped as soon as the operation of the switch is stopped. On the other hand, when the switch for causing the window to be raised and the switch for causing the operation of the window 1 to be automatically continued are simultaneously operated, the raising of the window 1 is also continued after the operation of the switch for causing the window to be raised stops. In this case, when the window 1 reaches the top of the window frame, the window 1 is stopped. Moreover, the switch for causing the window 1 to be lowered and the switch for causing the operation of the window 1 to be automatically continued are simultaneously operated, the lowering of the window 1 is also continued after the operation of the switch for causing the window 1 to be lowered stops. In this case, when the window 1 reaches the bottom of the window frame, the window 1 is stopped.

As shown in FIG. 2A, the pulse generator 5 includes a magnetic rotator 5a rotated by the motor 2, and two Hall elements 5b and 5c disposed at an angle of 90° to each other on the circumference of the rotator 5a. As shown in FIG. 2B, the pulse generator 5 outputs two-phase rectangular wave pulses formed by the Hall elements 5b and 5c to have a phase difference of 90°.

The motor driving unit 6 includes two inverters 6b and 6c for reversing control signals and two relays 6d and 6e for setting the rotation of the motor 2 to be switched to any one of a normal rotation, a reverse rotation, and a stop, and rotates the motor 2 in accordance with the state of control signals supplied from the MCU 8.

The window motion detecting unit 7 is provided between the window 1 and the window frame 1a, and outputs position detecting signals in accordance with the raising operation of the window 1. A position-detecting sensor, such as a variable resistor or an encoder, can be used as the window motion detecting unit 7.

As shown in FIG. 1, the MCU 8 includes a control processor 11, a memory 12, a motor driving voltage detector 13, a pulse edge counter 14, a timer 15, and a window movement counter 16.

Position detecting signals M output from the window motion detecting unit 7 when the operation of the window 1 starts are counted by the window movement counter 16 of the MCU 8, and the timing of the start of the operation of the window 1 can be detected. In the invention, a backlash of the driving system is detected as a time difference from a point of time when the motor 2 is started, the pulse generator 5 generates pulses, and then the control processor 11 receives the pulses, to a point of time when the control processor 11 receives the counted values from the window movement counter 16, that is, when the start of the operation of the window 1 is confirmed. A state without the backlash generally means a state in which the time difference is nearly zero. However, since there is a limitation on the resolution of the pulse generator 5 and the window motion detector 7, the time difference occurs even though the backlash is zero. That is, if the time difference is not more than the corresponding value to the minimum value of the resolution, a backlash is close to zero or is deemed to be in the range to which the technology of the invention can be applied. The time difference is defined as the number of pulses or time cycles received from the pulse generator 5 from the time when the control processor 11 receives the pulses generated from the pulse generator 5 to the time when the control processor 11 receives the counted values from the window movement counter 16.

The memory 12 is divided into a pinch detecting data storage area 12*a* in which constant numbers or computing equations required for pinch detection executed in the control processor 11 are stored, a storage area 12*b* for start cancellation period setting data in which constant numbers or computing equations required for the setting of the start cancellation period executed in the control processor 11 are stored, and a time table storage area 12*c* in which the operational sequence of the control processor 11 is stored. A backlash reference value required for determining whether a backlash exists in the driving system of the window 1, additional time required for computing the time of termination of the start cancellation period when a backlash larger than a predetermined backlash defined as the backlash reference value exists in the driving system of the window 1, and the number of revolutions of the motor or the threshold value of the motor input ratio required for setting the time of termination of the start cancellation period when a backlash larger than the predetermined backlash defined as the backlash reference value exists in the driving system of the window 1 are stored in the storage area 12*b* for start cancellation period setting data. The backlash reference value is defined as the number of pulses or time cycles received from the pulse generator 5, and is set as, for example, one time cycle determined by experiments in consideration of the type of the driving system and the resolution of the pulse generator 5 and the window motion detector 7. The additional time is a value corresponding to a time T2 from when the number of revolutions of the motor reaches the peak to when the number of revolutions of the motor reaches a stable point P, and is a value obtained in advance through the experiments or simulations.

The motor driving voltage detecting unit 13 detects a voltage of the battery mounted on a vehicle, and the pulse edge counter 14 detects pulse edges of the two-phase rectangular wave pulses supplied from the pulse generator 5. In addition, the timer 15 supplies a clock required for predetermined data processing or data computation to the control processor 11.

The control processor 11 receives switch signals an input from the switch device 4, pulse signals b input from the pulse generator 5 through the pulse edge counter 14, driving voltage signals c input from the motor driving unit 6 through the motor driving voltage detector 13, window movement signals d input from the window motion detector 7 through the window movement counter 16, data signals e input from the memory 12, and timer signals f input from the timer 15 to execute the predetermined data processing or data computation. Then, the control processor 11 supplies control signals according to the operational state of the switch device 4 or whether the pinching exists or not to the motor driving unit 6 in order to control the start, stop, and reverse rotation of the motor 2. Furthermore, the control processor 11 determines whether the pinching exists or not on the basis of the signals a to f, and sets the start cancellation period in which the determination of the pinching is not performed.

That is, the control processor 11 controls the whole system. As shown in FIG. 3, when the switch device 4 is operated, the control processor 11 reads out each of the signals a to f (step S-1) and determines whether the window 1 is instructed to be raised (step S-2). In step S-2, when it is determined that the window 1 is instructed to be raised, the control processor 11 determines whether a backlash over a predetermined value exists in the driving system (step S-3).

In step S-3, when it is determined that a backlash over a predetermined value exists in the driving system, the control processor 11 sets a first start cancellation period (step S-4). Moreover, when the backlash obtained by the above-mentioned method is equal to or larger than the backlash stored in the storage area 12*b* for start cancellation period setting data of the memory 12, the control processor 11 determines that a backlash over a predetermined value exist in the driving system in step S-3.

After setting the start cancellation period, the control processor 11 waits for the passage of the start cancellation period (step S-5) and monitors whether the pinching occurs in the window 1 (step S-6). When it is determined in step S-6 that the pinching occurs, the control processor 11 performs a process required for avoiding the pinching, such as the stop or the reverse rotation of the motor 2 (step S-7), and terminates the system after the process required for avoiding the pinching is ended. When the raising of the window 1 is not instructed in step S-2, the process returns to step S-1. In addition, when it is determined in step S-3 that a backlash over a predetermined value does not exist in the driving system, the process proceeds to a method of employing a second cancellation period. Furthermore, a method disclosed in Japanese Unexamined Patent Application Publication No. 11-81793, which has been proposed before by the applicant of the invention, can be employed as the method of determining the pinching executed in step S-6.

Hereinafter, the method of setting the start cancellation period executed by the control processor 11 will be described with reference to FIGS. 4 and 5.

FIG. 4 is a flowchart illustrating the sequence for setting the first start cancellation period. When it is determined in step S-3 shown in FIG. 3 that a backlash over a predetermined value exists in the driving system, the control processor 11 receives the pulse signals b input from the pulse generator 5 through the pulse edge counter 14 (step S-11), and computes the number of revolutions of the motor and the variation of the number of revolutions of the motor per unit time (step S-12). Then, the control processor 11 detects the peak of the number of revolutions from the variation of the number of revolutions of the motor per unit time (step S-13). Next, the control processor 11 reads out the additional time data stored in the storage area 12*b* for start cancellation period setting data of the memory 12 (step S-14), and determines the termination of the start cancellation period (step S-15).

FIG. 5 is a flowchart illustrating the method of employing a second start cancellation period (S-8). When it is determined in step S-3 shown in FIG. 3 that a backlash over a predetermined value does not exist in the driving system, the process proceeds to the method of employing the second cancellation period (S-8), and then the control processor 11 reads out the threshold value of the motor input ratio stored in the storage area 12*b* for start cancellation period setting data of the memory 12 (S-21), and receives the driving voltage signals c input from the motor driving unit 6 through the motor driving voltage detector 13 to compute the motor input ratio (step S-22). After that, the control processor 11 determines whether the computed motor input ratio reaches the threshold of the motor input ratio stored in the storage area 12*b* for start cancellation period setting data of the memory 12 (step S-23). Then, when it is determined that the computed motor input ratio reaches the threshold of the motor input ratio stored in the storage area 12*b* for start cancellation period setting data of the memory 12, the control processor 11 determines that the second cancellation period is terminated, and then performs step S-6 to determine whether the pinching occurs in the window 1.

In this way, when it is determined that a backlash over a predetermined value exists in the driving system, the power window apparatus with a pinch detecting function according to the present embodiment sets the passed time of the time T2 from when the peak of the number of revolutions of the motor is detected to when the number of revolutions of the motor reaches the stable point obtained in advance at the time of the termination of the start cancellation period T. Accordingly, it is possible to optimize the termination time of the start cancellation period T depending on the value of the backlash shown in the driving system of the window 1, and to prevent the start cancellation period from being set to be unnecessarily long at the time of the start of the motor.

In addition, in the case in which a backlash over a predetermined value exists in the driving system of the window 1, when a motor input ratio in which a stable output is obtained reaches a predetermined value (for example, 97%), it is regarded that the number of revolutions of the motor reaches the stable point P. This time is used as the termination of the start cancellation period T. Therefore, it is possible to set the start cancellation period to be shorter at the time of the start of the motor, and to further improve the reliability of the power window apparatus with a function to detect the pinching.

Meanwhile, in the embodiment, in the case in which the backlash over the predetermined value exists in the driving system of the window 1, when the motor input ratio reaches the predetermined value (for example, 97%), it is regarded that the number of revolutions of the motor reaches the stable point. This time is used as the termination of the start cancellation period T. However, the invention is not limited thereto. Instead of the structure, in the case that a backlash over a predetermined value does not exist in the driving system of the window 1, when the rate of change of the number of revolutions of the motor reaches a predetermined value (for example, 97%), it is regarded that the number of revolutions of the motor reaches the stable point P. This time can be also used as the termination of the start cancellation period T.

Next, a power window apparatus with a pinch detecting function according to a second embodiment of the invention will be described. A block diagram of the power window apparatus with a pinch detecting function according to the second embodiment is shown in FIG. 7. The power window apparatus does not include the window motion detector 7 constituting the backlash-detecting member and the window movement counter 16, compared to the power window apparatus according to the first embodiment, and the control processor 11 does not determine whether a backlash exists or not from the time difference from a point of time when the control processor 11 receives the start of the generation of the pulses in the pulse generator 5 to a point of time when the control processor 11 receives the counted values from the window movement counter 16. In addition, this embodiment is similar to the first embodiment except that the control processor 11 sets the start cancellation period of the pinch detection on the basis of the input ratio and output ratio of the motor 2 together with the pulse signals, and stores the threshold value of the output ratio in the memory area 12. In this embodiment, the same reference numerals as those of the first embodiment are given to the components having the same functions as those of the first embodiment, and a description thereof will be omitted.

The memory 12 is divided into a pinch detecting data storage area 12a in which constant numbers or computing equations required for pinch detection executed in the control processor 11 are stored, a storage area 12b for start cancellation period setting data in which constant numbers or computing equations required for the setting of the start cancellation period executed in the control processor 11 are stored, and a time table storage area 12c in which the operational sequence of the control processor 11 is stored. A threshold value of the motor output ratio required for determining whether a backlash exists in the driving system of the window 1, additional time required for computing the time of termination of the start cancellation period when a backlash over a predetermined value exists in the driving system of the window 1, and A threshold value of the rate of change of the number of revolutions of the motor or a threshold value of the motor input ratio required for setting the time of termination of the start cancellation period when a backlash larger than a predetermined value exists in the driving system of the window 1 are stored in the storage area 12b. The threshold value of the motor input ratio, the threshold value of the additional time and the rate of change of the number of revolutions of the motor, or the threshold value of the motor input ratio are obtained in advance by experiments or simulations.

The control processor 11 receives switch signals an input from the switch device 4, pulse signals b input from the pulse generator 5 through the pulse edge counter 14, driving voltage signals c input from the motor driving unit 6 through the motor driving voltage detector 13, data signals d input from the memory 12, and timer signals e input from the timer 15 to execute predetermined data processing or data computation. Then the control processor 11 supplies control signals f according to the operational state of the switch device 4 or whether the pinching exists or not to the motor driving unit 6 in order to control the start, stop, and reverse rotation of the motor 2. Furthermore, the control processor 11 calculates an input voltage Vin and a voltage Vout1, which is a first delay value (correction voltage) of the input voltage Vin on the basis of the driving voltage signals c, and calculates a motor input ratio Rin=Vout1/Vin. Here, a motor output ratio Rout is calculated by the ratio of an electric voltage Vout2 to the first delay value (correction voltage) Vout1 of the input voltage Vin, that is, Vout2/Vout1. The electric voltage Vout2 is calculated by the product of an electric constant number Kt (Vin/rpm) and the number of revolutions N (rpm) of the motor. The electric constant number Kt is obtained from the characteristic value of the motor to be used, and the number of revolutions N (rpm) of the motor is obtained by the pulse signals output from the pulse edge counter 14.

In a case in which the window 1 is operated to be raised, when a backlash does not exist in the driving system for raising and lowering the window and no foreign object is pinched at the time of the start of the motor, as shown in FIG. 8, the motor output ratio [the ratio of the electric voltage Vout2 to the first delay value (correction voltage) Vout1 of the input voltage Rout=Vout2/Vout1] is changed to a substantially constant value. Correspondingly, when a backlash exists in the driving system for raising and lowering the window and no foreign object is pinched at the time of the start of the motor, the motor enters a state close to unloaded condition. Therefore, as shown in FIG. 8, the motor output ratio becomes a considerably high value, and then decreases with the revolution of the motor to become a predetermined stable value after the passage of a predetermined time from the start of the motor. As described above, since the motor output ratio remarkably varies depending on the absence or presence of a backlash in the driving system, it is possible to determine whether a backlash over a predetermined value exists or not in the driving system by monitoring the value of the motor output value.

In addition, the control processor 11 determines whether a foreign object is pinched on the basis of each of the signals a to e in order to set the start cancellation period in which the determination of the pinching does not performed.

That is, the control processor 11 controls the whole system. As shown in FIG. 3, when the switch device 4 is operated, the control processor 11 reads out each of the signals a to e (step S-1), and determines whether the window 1 is instructed to be raised (step S-2). When it is determined in step S-2 that the window 1 is instructed to be raised, the control processor 11 computes the motor output ratio, and determines whether a backlash over a predetermined value exists in the driving system by comparing the computed motor output ratio with the threshold value of the output ratio stored in the storage area 12b for start cancellation period setting data of the memory 12 (step S-3). When it is determined in step S-3 that a backlash over a predetermined value exists in the driving system, the control processor 11 sets a first start cancellation period (step S-4). Furthermore, the control processor 11 properly sets the threshold value of the output ratio according to the input voltage of the motor 2 on the basis of the data shown in FIG. 9 when it is determined whether a backlash exists in the driving system. That is, since the motor output ratio Rout depends on the input voltage Vin, it is preferable that the threshold value of the output ratio be varied with the variation of the input voltage Vin. The experiments prove that the motor input ratio Rout is varied substantially linearly with the variation of the input voltage Vin. However, for the simplification of the threshold value of the output ratio, as shown in FIG. 8, the input voltage Vin is divided into several ranges, and one threshold value of the output ratio is applied to one range. Specifically, when the input voltage is lower than 11.75 V, the threshold value of the output ratio is set to 80%. Further, when the input voltage is equal to or higher than 11.75 V and is equal to or lower than 15.25 V, the threshold value of the output ratio is set to 85%. Furthermore, when the input voltage exceeds 15.25 V, the threshold value of the output ratio is set to 90%. Accordingly, even though the input voltage is varied, it is possible to correctly determine whether a backlash exists or not.

Since the subsequent sequences after the setting of the start cancellation period are the same as those of the first embodiment described above, a description thereof will be omitted.

In this way, when it is determined that a backlash over a predetermined value exists in the driving system, the power window apparatus with a pinch detecting function according to the present embodiment sets the passed time of the time T2 from when the peak of the number of revolutions of the motor is detected to when the number of revolutions of the motor reaches the stable point obtained in advance at the time of the termination of the start cancellation period T. Accordingly, it is possible to optimize the termination time of the start cancellation period T depending on the value of the backlash shown in the driving system of the window 1, and to prevent the start cancellation period from being set to be unnecessarily long at the time of the start of the motor.

The power window apparatus with a pinch detecting function according to the invention determines whether a backlash over a predetermined value exists in the window driving system by the backlash-detecting member and the control unit. Then, when it is determined that the backlash over the predetermined value exists in the driving system, the power window apparatus sets a termination time of the start cancellation period on the basis of the time when the peak of the number of revolutions of the motor is detected. On the other hand, when it is determined that the backlash over the predetermined value does not exist in the driving system, the power window apparatus sets, as the termination time of the start cancellation period, the time when the rate of change of the number of revolutions of the motor reaches a predetermined value or the time when the rate of change of the motor input ratio reaches a predetermined value. Therefore, it is possible to prevent the start cancellation period from being inappropriately set at the time of the start of the motor, and to more reliably detect whether the pinching occurs in the window. Accordingly, it is possible to further improve the reliability of the power window apparatus with a pinch detecting function.

In addition, the power window apparatus with a pinch detecting function according to the invention determines whether a backlash over a predetermined value exists in the window driving system by the control unit on the basis of the motor output ratio. Then, when it is determined that the backlash over the predetermined value exists in the driving system, the power window apparatus sets a termination time of the start cancellation period on the basis of the time when the peak of the number of revolutions of the motor is detected. On the other hand, when it is determined that the backlash over the predetermined value does not exist in the driving system, the power window apparatus sets, as the termination time of the start cancellation period, the time when the rate of change of the number of revolutions of the motor reaches a predetermined value or the time when the rate of change of the motor input ratio reaches a predetermined value. Therefore, it is possible to prevent the start cancellation period from being inappropriately set at the time of the start of the motor, and to more reliably detect whether the pinching occurs in the window. Accordingly, it is possible to further improve the reliability of the power window apparatus with a pinch detecting function.

The invention claimed is:

1. A power window apparatus with a pinch detecting function comprising:
    a motor that opens and closes a window through a window driving mechanism;
    a pulse generator that outputs pulse signals corresponding to a rotation of the motor;
    a switch device that outputs switch signals to manually open and close the window; and
    a control unit that generates control signals for controlling the motor according to the pulse signals and the switch signals,
    wherein, when the window is operated to be closed by the switch device, the control unit determines whether a pinching occurs in the window, and when it is determined that the pinching occurs in the window, the control unit performs a process required for avoiding the pinching,
    the control unit does not determine whether the pinching occurs in the window in a start cancellation period from the time when the motor is started to the time when the number of revolutions of the motor reaches a stable point,
    the control unit includes a backlash-detecting member that detects a backlash of a driving system having the window driving mechanism, and determines whether a backlash over a predetermined value exists in the driving system on the basis of input from the backlash-detecting member, when it is determined that the backlash over the predetermined value exists in the driving system, the control unit sets a termination time of the start cancellation period on the basis of the time when the peak of the number of revolutions of the motor is detected, and when it is determined that the backlash over the predetermined value does not exist in the driving system, the time when the rate of change of the number of revolutions of the motor reaches a predetermined value or the time when the rate of change of the motor input ratio reaches a predetermined value is set to the termination time of the start cancellation period.

2. The power window apparatus with a pinch detecting function according to claim 1, wherein, when the backlash over the predetermined value exists in the driving system, a period from the time when the peak of the number of revolutions of the motor is detected to the time when the number of revolutions of the motor reaches the stable point is obtained in advance, and the time passed from the detection of the peak of the number of revolutions of the motor to the previously obtained time is set as the termination time of the start cancellation period.

3. A power window apparatus with a pinch detecting function comprising:

a motor that opens and closes a window through a window driving mechanism;

a pulse generator that outputs pulse signals corresponding to a rotation of the motor;

a switch device that outputs switch signals to manually open and close the window; and a control unit that generates control signals for controlling the motor according to the pulse signals and the switch signals, wherein, when the window is operated to be closed by the switch device, the control unit determines whether a pinching occurs in the window, and when it is determined that the pinching occurs in the window, the control unit performs a process required for avoiding the pinching, the control unit does not determine whether the pinching occurs in the window in a start cancellation period from the time when the motor is started to the time when the number of revolutions of the motor reaches a stable point, the control unit computes a motor output ratio from the start time of the motor to determine whether a backlash over a predetermined value exists in a driving system including the window driving mechanism and the motor by comparing the computed output ratio with a predetermined threshold value of the output ratio obtained in advance, and detects the number of revolutions of the motor, when it is determined that the computed output ratio of the motor is higher than the predetermined threshold value of the output ratio, the control unit determines that the backlash over the predetermined value exists in the driving system, and sets a termination time of the start cancellation period on the basis of the time when the peak of the number of revolutions of the motor is detected, and when it is determined that the backlash over the predetermined value does not exist in the driving system, the time when the rate of change of the number of revolutions of the motor reaches a predetermined value or the time when the rate of change of a motor input ratio reaches a predetermined value is set to the termination time of the start cancellation period.

4. The power window apparatus with a pinch detecting function according to claim 3, wherein the control unit varies the predetermined threshold value of the output ratio according to an input voltage value of the motor.

5. The power window apparatus with a pinch detecting function according to claim 3, wherein, when the backlash over the predetermined value exists in the driving system, a period from the time when the peak of the number of revolutions of the motor is detected to the time when the number of revolutions of the motor reaches the stable point is obtained in advance, and the time passed from the detection of the peak of the number of revolutions of the motor to the previously obtained time is set as the termination time of the start cancellation period.

* * * * *